US011447040B2

(12) United States Patent
Brown et al.

(10) Patent No.: US 11,447,040 B2
(45) Date of Patent: Sep. 20, 2022

(54) SIDE-BY-SIDE VEHICLE

(71) Applicant: Polaris Industries Inc., Medina, MN (US)

(72) Inventors: Jeremy M. Brown, Menifee, CA (US); R. Mark Lopera, Lake Elsinore, CA (US); Peter L. Negrete, Riverside, CA (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/523,471

(22) Filed: Jul. 26, 2019

(65) Prior Publication Data

US 2021/0023965 A1   Jan. 28, 2021

(51) Int. Cl.
*B60N 2/015*   (2006.01)
*B60N 2/68*    (2006.01)
*B60N 2/30*    (2006.01)
*B60N 2/04*    (2006.01)

(52) U.S. Cl.
CPC ............. *B60N 2/015* (2013.01); *B60N 2/682* (2013.01); *B60N 2/04* (2013.01); *B60N 2/3009* (2013.01)

(58) Field of Classification Search
CPC ............... B60N 2/015; B60N 2/01508; B60N 2/01506; B60N 2/0155; B60N 2/682; B60N 2/04; B60N 2/01583; B60N 2/005; B60N 2/38; B62D 21/183; B62D 1/183; B64D 11/0696
USPC .................................. 297/452.18; 296/65.03
See application file for complete search history.

(56) References Cited

U.S. PATENT DOCUMENTS

| | | | |
|---|---|---|---|
| 3,422,918 A | | 1/1969 | Musser |
| 3,600,768 A | | 8/1971 | Romanzi |
| 3,663,057 A | * | 5/1972 | Lohr ...................... B60N 2/688 |
| | | | 297/452.14 |
| 3,758,159 A | * | 9/1973 | Morris ................. B60N 2/5825 |
| | | | 297/452.14 |
| 4,046,403 A | | 9/1977 | Yoshida |
| 4,455,049 A | | 6/1984 | Martin |
| 4,650,210 A | | 3/1987 | Hirose |
| 4,817,985 A | | 4/1989 | Enokimoto |
| 5,306,044 A | | 4/1994 | Tucker |
| 5,327,989 A | | 7/1994 | Furuhashi |
| 5,496,088 A | * | 3/1996 | Stewart ............. B60N 2/01583 |
| | | | 248/503.1 |

(Continued)

FOREIGN PATENT DOCUMENTS

| | | |
|---|---|---|
| DE | 37435 | 11/1886 |
| DE | 102009038853 | 3/2011 |

(Continued)

OTHER PUBLICATIONS

International Preliminary Report on Patentability issued by the International Searching Authority, dated Aug. 5, 2014, for International Patent Application No. PCT/US2013/024664; 7 pages.

(Continued)

*Primary Examiner* — Kyle J. Walraed-Sullivan
(74) *Attorney, Agent, or Firm* — Faegre Drinker Biddle & Reath LLP (57) ABSTRACT

The present invention relates to a replacement seat for utility vehicles configured to couple to the frame of the utility vehicle without modifications and/or additional parts.

15 Claims, 7 Drawing Sheets

(56) References Cited

U.S. PATENT DOCUMENTS

| | | | |
|---|---|---|---|
| 5,498,051 A * | 3/1996 | Sponsler | B60N 2/01583 296/65.03 |
| 5,547,242 A * | 8/1996 | Dukatz | B60N 2/01583 116/283 |
| 5,562,322 A * | 10/1996 | Christoffel | B60N 2/01583 248/503.1 |
| 5,626,391 A * | 5/1997 | Miller | B60N 2/01583 297/331 |
| 5,738,471 A | 4/1998 | Zentner | |
| 5,752,791 A | 5/1998 | Ehrlich | |
| 5,765,894 A * | 6/1998 | Okazaki | B60N 2/01583 296/65.03 |
| 5,775,763 A * | 7/1998 | Glinter | B60N 2/01583 296/65.03 |
| 5,816,650 A | 10/1998 | Lucas | |
| 5,895,063 A | 4/1999 | Hasshi | |
| 5,964,172 A | 10/1999 | Ikeda | |
| 5,997,069 A * | 12/1999 | Coffey | B60N 2/01591 296/65.01 |
| 6,065,804 A * | 5/2000 | Tanaka | B60N 2/01583 297/336 |
| 6,086,158 A | 7/2000 | Zeoli | |
| 6,113,328 A | 9/2000 | Claucherty | |
| 6,234,574 B1 * | 5/2001 | Hoshihara | B60N 2/01583 297/336 |
| 6,279,981 B1 * | 8/2001 | Mesnage | B60N 2/002 296/65.03 |
| 6,293,588 B1 | 9/2001 | Clune | |
| 6,293,610 B1 | 9/2001 | Howard | |
| 6,295,713 B1 | 10/2001 | Hilliard | |
| 6,309,024 B1 | 10/2001 | Busch | |
| 6,345,856 B1 * | 2/2002 | Minai | B60N 2/01583 296/65.03 |
| 6,354,663 B1 * | 3/2002 | Zhang | B60N 2/01583 297/336 |
| 6,375,245 B1 * | 4/2002 | Seibold | B60N 2/01583 248/503.1 |
| D467,200 S | 12/2002 | Luo | |
| 6,523,899 B1 * | 2/2003 | Tame | B60N 2/01583 297/331 |
| 6,582,004 B1 | 6/2003 | Hamm | |
| 6,755,269 B1 | 6/2004 | Davis | |
| D497,324 S | 10/2004 | Chestnut | |
| 6,868,584 B2 | 3/2005 | Trottier | |
| D503,657 S | 4/2005 | Katoh | |
| D504,638 S | 5/2005 | Tanaka | |
| D506,961 S | 7/2005 | Sugimoto | |
| D511,317 S | 11/2005 | Tanaka | |
| 7,014,241 B2 | 3/2006 | Toyota | |
| 7,121,371 B2 | 10/2006 | Rondeau | |
| 7,258,192 B2 | 8/2007 | Davis | |
| 7,281,753 B2 | 10/2007 | Curtis | |
| D555,036 S | 11/2007 | Eck | |
| D555,058 S | 11/2007 | Curtis, Jr | |
| D557,191 S | 12/2007 | Curtis, Jr | |
| 7,331,418 B2 | 2/2008 | Audet | |
| 7,377,570 B2 | 5/2008 | Rondeau | |
| D578,433 S | 10/2008 | Kawaguchi | |
| D578,934 S | 10/2008 | Tanaka | |
| 7,431,024 B2 | 10/2008 | Buckwitz | |
| 7,506,714 B2 | 3/2009 | Davis | |
| D592,998 S | 5/2009 | Woodard | |
| D595,613 S | 7/2009 | Lai | |
| 7,596,448 B2 | 9/2009 | Suzuki | |
| 7,597,385 B2 | 10/2009 | Shibata | |
| D604,201 S | 11/2009 | Kawaguchi | |
| D605,555 S | 12/2009 | Tanaka | |
| D606,900 S | 12/2009 | Flores | |
| 7,625,048 B2 | 12/2009 | Rouhana | |
| D607,377 S | 1/2010 | Shimomura | |
| 7,677,646 B2 | 3/2010 | Nakamura | |
| 7,717,495 B2 | 5/2010 | Leonard | |
| D621,423 S | 8/2010 | Nakanishi | |
| D622,631 S | 8/2010 | Lai | |
| 7,795,602 B2 | 9/2010 | Leonard | |
| D624,848 S | 10/2010 | Shimomura | |
| D625,662 S | 10/2010 | Li | |
| 7,819,220 B2 | 10/2010 | Sunsdahl | |
| 7,832,770 B2 | 11/2010 | Bradley | |
| D631,395 S | 1/2011 | Tandrup | |
| D631,791 S | 2/2011 | Sanschagrin | |
| D633,006 S | 2/2011 | Sanschagrin | |
| 7,913,505 B2 | 3/2011 | Nakamura | |
| D636,704 S | 4/2011 | Yoo | |
| D640,598 S | 6/2011 | Zhang | |
| D641,288 S | 7/2011 | Sun | |
| D642,493 S | 8/2011 | Goebert | |
| 7,988,210 B2 | 8/2011 | Shibata | |
| 8,052,202 B2 | 11/2011 | Nakamura | |
| 8,215,694 B2 | 7/2012 | Smith | |
| 8,328,235 B2 | 12/2012 | Schneider | |
| 8,464,824 B1 | 6/2013 | Reisenberger | |
| 8,465,050 B1 | 6/2013 | Spindler | |
| 8,548,710 B1 | 10/2013 | Reisenberger | |
| 8,596,405 B2 | 12/2013 | Sunsdahl | |
| 8,613,335 B2 | 12/2013 | Deckard | |
| 8,640,814 B2 | 2/2014 | Deckard | |
| 8,781,705 B1 | 7/2014 | Reisenberger | |
| 8,827,025 B2 | 9/2014 | Hapka | |
| 8,827,028 B2 | 9/2014 | Sunsdahl | |
| 8,905,435 B2 | 12/2014 | Ripley | |
| 8,998,289 B2 | 4/2015 | Peterson | |
| 9,327,587 B2 | 5/2016 | Spindler | |
| 9,393,894 B2 | 7/2016 | Steinmetz | |
| D762,522 S | 8/2016 | Kinoshita | |
| 9,573,561 B2 | 2/2017 | Muto | |
| 9,694,650 B1 | 7/2017 | Ohshita | |
| 9,718,351 B2 | 8/2017 | Ripley | |
| 9,725,023 B2 | 8/2017 | Miller | |
| 9,776,481 B2 | 10/2017 | Deckard | |
| 9,822,562 B2 | 11/2017 | Borth | |
| D804,993 S | 12/2017 | Eck | |
| D805,982 S | 12/2017 | Ito | |
| D835,545 S | 12/2018 | Hanten | |
| 10,369,861 B2 | 8/2019 | Deckard | |
| 10,369,869 B2 | 8/2019 | Mazzareilli | |
| 10,427,551 B1 * | 10/2019 | Loza | B60N 2/015 |
| D868,659 S | 12/2019 | Mikhailov | |
| 10,632,823 B1 | 4/2020 | Osorio | |
| D883,163 S | 5/2020 | McMath | |
| D883,164 S | 5/2020 | McMath | |
| D889,343 S | 7/2020 | Bertin | |
| 10,737,596 B2 * | 8/2020 | Zou | B60N 2/0732 |
| 10,780,766 B2 | 9/2020 | Hagedorn | |
| D901,350 S | 11/2020 | Marti Sala | |
| D903,565 S | 12/2020 | Peplowski | |
| 2001/0031185 A1 | 10/2001 | Swensen | |
| 2002/0043605 A1 * | 4/2002 | Hibino | B60N 2/01583 248/429 |
| 2002/0105203 A1 * | 8/2002 | Hansen | B60N 2/01583 296/65.03 |
| 2002/0135175 A1 | 9/2002 | Schroth | |
| 2003/0151278 A1 | 8/2003 | Bertrand | |
| 2003/0233732 A1 | 12/2003 | Kohlstrand | |
| 2004/0031640 A1 | 2/2004 | Tweet | |
| 2004/0075292 A1 * | 4/2004 | Rausch | B60N 2/085 296/65.03 |
| 2004/0112668 A1 | 6/2004 | Rondeau | |
| 2004/0232684 A1 | 11/2004 | Curl | |
| 2004/0239088 A1 | 12/2004 | Rondeau | |
| 2005/0073187 A1 | 4/2005 | Frank | |
| 2005/0077098 A1 | 4/2005 | Takayanagi | |
| 2005/0173177 A1 | 8/2005 | Smith | |
| 2005/0247506 A1 | 10/2005 | Rondeau | |
| 2005/0279330 A1 | 12/2005 | Okazaki | |
| 2006/0006696 A1 | 1/2006 | Umemoto | |
| 2006/0043131 A1 * | 3/2006 | Graham | B62M 27/02 224/408 |
| 2006/0066122 A1 | 3/2006 | Wiseman | |
| 2006/0249972 A1 * | 11/2006 | Lutzka | B60N 2/01583 296/65.03 |
| 2007/0214818 A1 | 9/2007 | Nakamura | |

(56) References Cited

U.S. PATENT DOCUMENTS

| | | | |
|---|---|---|---|
| 2007/0257503 A1* | 11/2007 | Ball | B62D 21/02 |
| | | | 296/63 |
| 2008/0012380 A1* | 1/2008 | Takahana | B60N 2/0155 |
| | | | 296/65.03 |
| 2008/0023249 A1 | 1/2008 | Sunsdahl | |
| 2008/0084091 A1 | 4/2008 | Nakamura | |
| 2008/0093883 A1 | 4/2008 | Shibata | |
| 2008/0231090 A1* | 9/2008 | Takeda | B60N 3/063 |
| | | | 297/83 |
| 2008/0256738 A1 | 10/2008 | Malone | |
| 2008/0296884 A1 | 12/2008 | Rouhana | |
| 2009/0184531 A1 | 7/2009 | Yamamura | |
| 2009/0301830 A1 | 12/2009 | Kinsman | |
| 2010/0084212 A1* | 4/2010 | Smith | B60N 2/38 |
| | | | 180/311 |
| 2010/0090797 A1 | 4/2010 | Koenig | |
| 2010/0194086 A1 | 8/2010 | Yamamura | |
| 2010/0314184 A1 | 12/2010 | Stenberg | |
| 2010/0314191 A1 | 12/2010 | Deckard | |
| 2011/0109146 A1* | 5/2011 | Ida | B60N 2/01583 |
| | | | 297/463.1 |
| 2011/0155087 A1 | 6/2011 | Wenger | |
| 2011/0297462 A1 | 12/2011 | Grajkowski | |
| 2011/0309118 A1 | 12/2011 | Wada | |
| 2012/0031693 A1 | 2/2012 | Deckard | |
| 2012/0223500 A1 | 9/2012 | Kinsman | |
| 2012/0242105 A1* | 9/2012 | Haeske | B60N 2/01583 |
| | | | 296/65.03 |
| 2013/0033070 A1 | 2/2013 | Kinsman | |
| 2013/0047400 A1* | 2/2013 | L'Huillier | F16B 21/09 |
| | | | 29/426.2 |
| 2013/0062909 A1* | 3/2013 | Harris | B62D 33/0273 |
| | | | 296/182.1 |
| 2013/0199097 A1 | 8/2013 | Spindler | |
| 2013/0319785 A1 | 12/2013 | Spindler | |
| 2014/0103627 A1 | 4/2014 | Deckard | |
| 2014/0353956 A1 | 12/2014 | Bjerketvedt | |
| 2015/0014974 A1 | 1/2015 | Cotnoir | |
| 2015/0175114 A1 | 6/2015 | Schroeder | |
| 2015/0259011 A1* | 9/2015 | Deckard | B60J 5/0487 |
| | | | 280/781 |
| 2016/0032625 A1 | 2/2016 | Suzuki | |
| 2017/0129441 A1* | 5/2017 | Murthy | B60N 2/015 |
| 2017/0174101 A1* | 6/2017 | Gebauer | B60N 2/01516 |
| 2018/0065465 A1 | 3/2018 | Ward | |
| 2018/0147966 A1* | 5/2018 | Reed | B60J 5/0487 |
| 2019/0210484 A1 | 7/2019 | Deckard | |
| 2019/0210668 A1 | 7/2019 | Endrizzi | |
| 2019/0263294 A1* | 8/2019 | Nishiguchi | B60P 3/34 |
| 2019/0389349 A1* | 12/2019 | Sztajnert | B60N 2/682 |
| 2020/0324671 A1* | 10/2020 | Riad | B60N 2/01583 |

FOREIGN PATENT DOCUMENTS

| | | |
|---|---|---|
| EP | 1493624 | 1/2005 |
| EP | 1878645 | 1/2008 |
| EP | 2057060 | 5/2009 |
| FR | 2914597 | 10/2008 |
| GB | 2036659 | 7/1980 |
| JP | 7040783 | 2/1995 |
| JP | 2001130304 | 5/2001 |
| JP | 2003237530 | 8/2003 |
| JP | 2010095106 | 4/2010 |
| JP | 6325977 | 5/2018 |
| WO | 2008/016377 | 2/2008 |
| WO | WO 2019/140026 | 7/2019 |

OTHER PUBLICATIONS

International Preliminary Report on Patentability issued by the International Searching Authority, dated Apr. 14, 2015, for International Patent Application No. PCT/US2013/064516; 18 pages.
Patent Examination Report issued by the Australian Government IP Australia, dated Apr. 7, 2016, for Australian Patent Application No. 2013329090; 3 pages.
International Search Report and Written Opinion issued by the European Patent Office, dated Jan. 14, 2014, for International Patent Application No. PCT/US2013/064516; 23 pages.
New for 2004, Yamaha Rhino 660 4x4, ATV Connection Magazine, copyright 2006; 3 pages.
Yamaha, Company Website, 2006 Rhino 450 Auto 4x4, copyright 2005; 3 pages.
Yamaha, Company Website, 2006 Rhino 660 Auto 4x4 Special Edition, copyright 2006; 4 pages.
Yamaha Company Website, 2006 Rhino 660 Auto 4x4, copyright 2006; 4 pages.
Yamaha, Company Website, Rhino 660 Auto 4x4 Exploring Edition Specifications, copyright 2006; 3 pages.
Arctic Cat, Company Website, Prowler XT650 H1, undated; 9 pages.
Club Car, Company Website, product pages for XRT 1500 SE, undated; 2 pages.
Honda Hippo 1800 New Competition for Yamaha's Rhino, Dirt Wheels Magazine, Apr. 2006, pp. 91-92.
Buyer's Guide Supplement, 2006 Kart Guide, Powersports Business Magazine; 6 pages.
BRP Can-Am Commander photo, undated; 1 page.
Polaris Ranger Welcome to Ranger Country Brochure 2006, copyright 2005; 24 pages.
Polaris Ranger Brochure ATVs and Side x Side Brochure 2010, copyright 2009; 26 pages.
Polaris Ranger RZR Brochure 2011, copyright 2010; 16 pages.
Polaris Ranger Brochure 2011, copyright 2010; 22 pages.
Kawasaki Mule Utility Vehicle Brochure 2009, copyright 2008; 10 pages.
Kawasaki Mule The Off-Road Capable 610 4x4 XC Brochure 2011, copyright 2010; 6 pages.
Kawasaki Teryx Recreation Utility Vehicle Brochure 2009, copyright 2008; 8 pages.
Kawasaki Teryx 750 FI 4x4 Sport Brochure 2011, copyright 2010; 6 pages.
Polaris Ranger Off-Road Utility Vehicles Brochure 2004, copyright 2003; 20 pages.
Polaris Ranger Work/Play Only Brochure 2008, copyright 2007; 28 pages.
Polaris Ranger Brochure 2009, copyright 2008; 32 pages.
International Search Report and Written Opinion issued by the European Patent Office, dated Jun. 28, 2012, for International Patent Application No. PCT/US2012/024664; 19 pages.
International Preliminary Report on Patentability issued by the European Patent Office, dated Mar. 8, 2013, for Interational Patent Application No. PCT/US2012/024664; 24 pages.
International Search Report and Written Opinion issued by the European Patent Office, dated Jul. 23, 2013, for International Patent Application No. PCT/US2013/039304; 11 pages.
International Preliminary Report on Patentability issued by the European Patent Office, dated Nov. 4, 2014, for International Patent Application No. PCT/US2013/039304; 7 pages.
International Preliminary Report and Patentability issued by the European Patent Office, dated Apr. 14, 2015, for Interational Patent Application No. PCT/US2013/064516; 18 pages.
International Search Report and Written Opinion issued by the International Searching Authority, dated Jun. 15, 2009, for International Patent Application No. PCT/US2009/000677; 23 pages.

* cited by examiner

SIDE-BY-SIDE VEHICLE

RELATED APPLICATIONS

This application is related to U.S. patent application Ser. No. 16/244,462 filed Jan. 10, 2019, published as US Patent Application Publication Number 2019/0210668, the subject matter of which is incorporated herein by reference.

BACKGROUND OF THE PRESENT DISCLOSURE

The present invention relates to all-terrain vehicles and utility vehicles.

Generally, all-terrain vehicles ("ATVs") and utility vehicles ("UTVs") are used to carry one or two passengers and a small amount of cargo over a variety of terrains. UTVs and ATVs include seating for one or multiple passengers with seating for multiple passengers typically being side-by-side. In various situations and for various reasons, a user of the ATVs or UTVs may desire to replace to original seat provided with the ATV or UTV (or original equipment manufacturer "OEM" seat) with an after-market seat. However, current after-market seats require various alterations and/or additional hardware to allow the after-market seat to couple with the frame of the UTV or ATV. As such, an after-market seat is desired that is capable of being coupled to the frame of the UTV or ATV without modifications and/or additional parts.

SUMMARY OF THE PRESENT DISCLOSURE

According to an illustrative embodiment of the present disclosure, a replacement seat for a utility vehicle is provided. The replacement seat comprises a frame, and a seat base coupled to the frame, the seat base having a pair of seat coupling supports including an opening configured to receive pegs of a seat support coupled to a frame of the utility vehicle and a rod extending between the seat coupling supports and being configured to be received within openings of the seat support.

According to another illustrative embodiment of the present disclosure, a method of manufacturing a replacement seat for a vehicle, the replacement seat comprising a seat base and a frame is provided. The method comprises coupling the seat base to the frame, the seat base having a pair of seat coupling supports including an opening configured to receive pegs of a seat support coupled to a frame of the vehicle and a rod extending between the pair of seat coupling supports and being configured to be received within openings in the seat support.

According to yet another illustrative embodiment of the present disclosure, a seat for a utility vehicle is provided. The seat comprises a frame, and a seat base coupled to the frame, the seat base having a pair of seat coupling supports configured to be received by a seat support coupled to a frame of the utility vehicle, each of the seat coupling supports comprising first and second side walls, a bottom wall, a coupling member, and a top wall, wherein the top wall includes a plurality of openings, each opening configured to receive a portion of the coupling member.

DETAILED DESCRIPTION OF THE DRAWINGS

Corresponding reference characters indicate corresponding parts throughout the several views. Although the drawings represent embodiments of the present invention, the drawings are not necessarily to scale and certain features may be exaggerated in order to better illustrate and explain the present invention.

The embodiments disclosed below are not intended to be exhaustive or to limit the invention to the precise forms disclosed in the following detailed description. Rather, the embodiments are chosen and described so that others skilled in the art may utilize their teachings. For example, while the following description refers primarily to UTVs, certain features described herein may be applied to other applications such as ATVs, snowmobiles, motorcycles, mopeds, etc.

Figure 1:
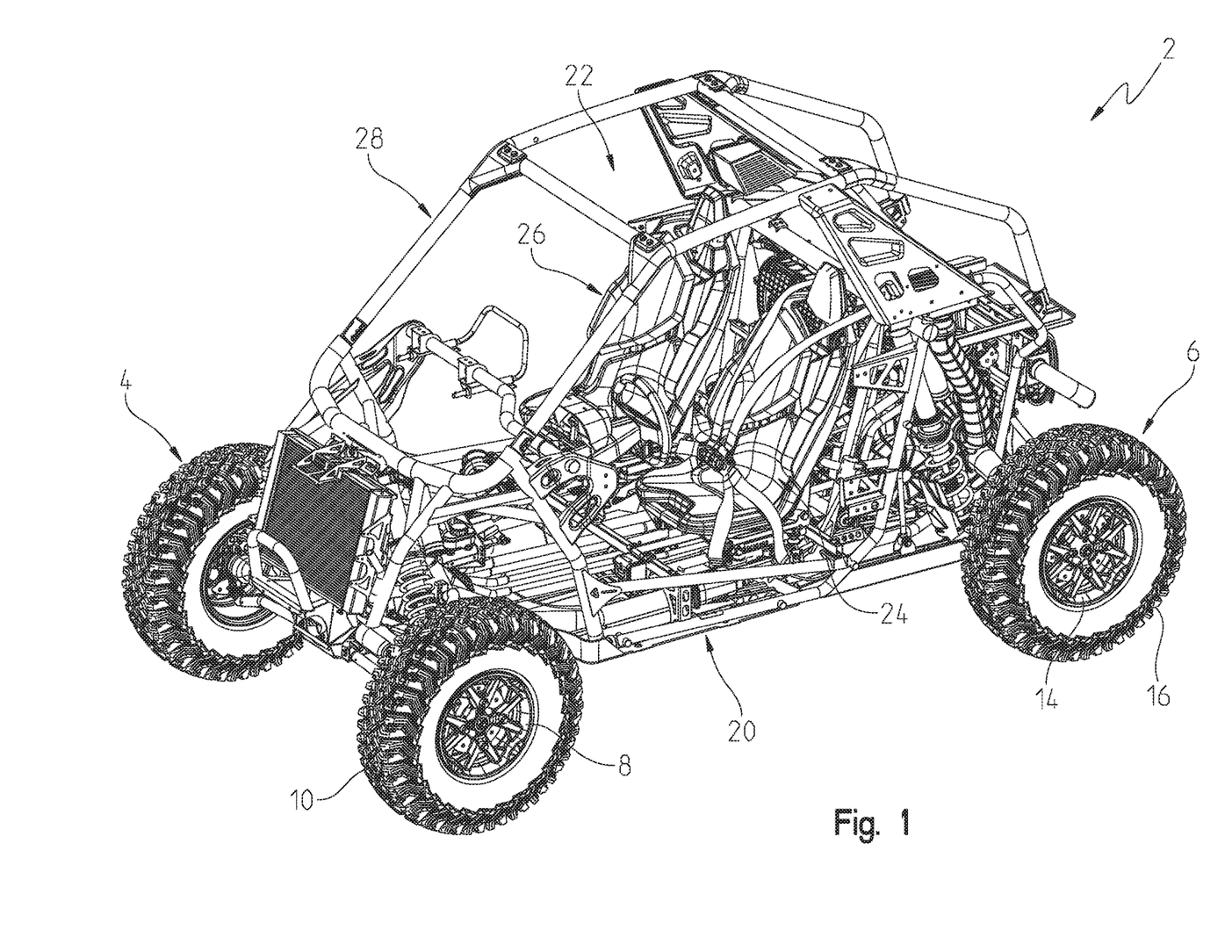
FIG. 1 shows a front left perspective view of a vehicle of the present disclosure.

With reference first to FIG. 1, the vehicle of the present disclosure will be described. The vehicle is shown generally at 2 and is commonly referred to as a utility vehicle ("UTV"). As shown, vehicle 2 generally comprises a frame 20 supported by ground engaging members 4 and 6. As shown in this disclosure, ground engaging members 4 and 6 are comprised of wheels having rims 8, 14 and tires 10, 16. Ground engaging members 4 and 6 support a vehicle frame 20 which supports a seating area 22 comprised of a driver's seat 24 and a passenger seat 26. Driver's seat 24 and passenger seat 26 are the original seats provided with vehicle 2, also known as the original equipment manufacturer or "OEM" seats. A cab frame 28 generally extends over the seating area 22. Vehicle 2 further comprises a drive train (not shown) operatively connected to frame 20 and drivingly connected to one or more of the ground engaging members 4, 6.

Figure 2:
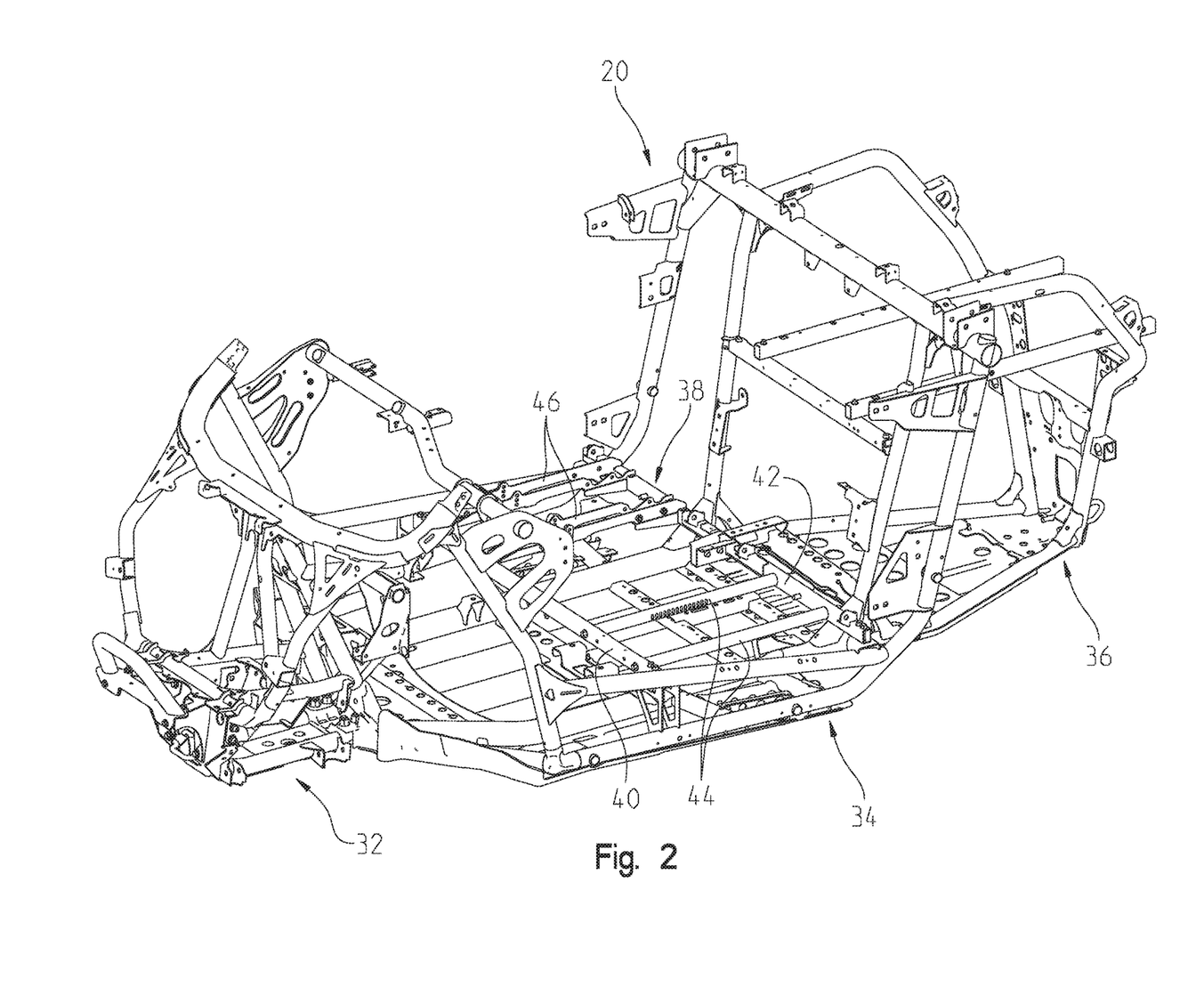
FIG. 2 shows a front left perspective view of a vehicle frame of the vehicle of FIG. 1 with a cab frame removed.

With respect now to FIG. 2, vehicle frame 20 will be described in greater detail. Vehicle frame 20 generally includes a front frame section 32, a mid-frame section 34, and a rear frame section 36. Mid-frame section 34 generally includes a seating support 38 including transverse frame tubes 40 and 42, longitudinal frame tubes 44, and longitudinal seat brackets 46. Longitudinal frame tubes 44 and longitudinal seat brackets 46 extend between and couple transverse frame tubes 40 and 42. Longitudinal frame tubes 44 support driver's seat 24, while longitudinal seat brackets 46 support passenger seat 26. In various embodiments, passenger seat 26 may be supported similarly to driver's seat 24, while in other various embodiments, driver's seat 24 may be supported similarly to passenger seat 26.

Figure 3:
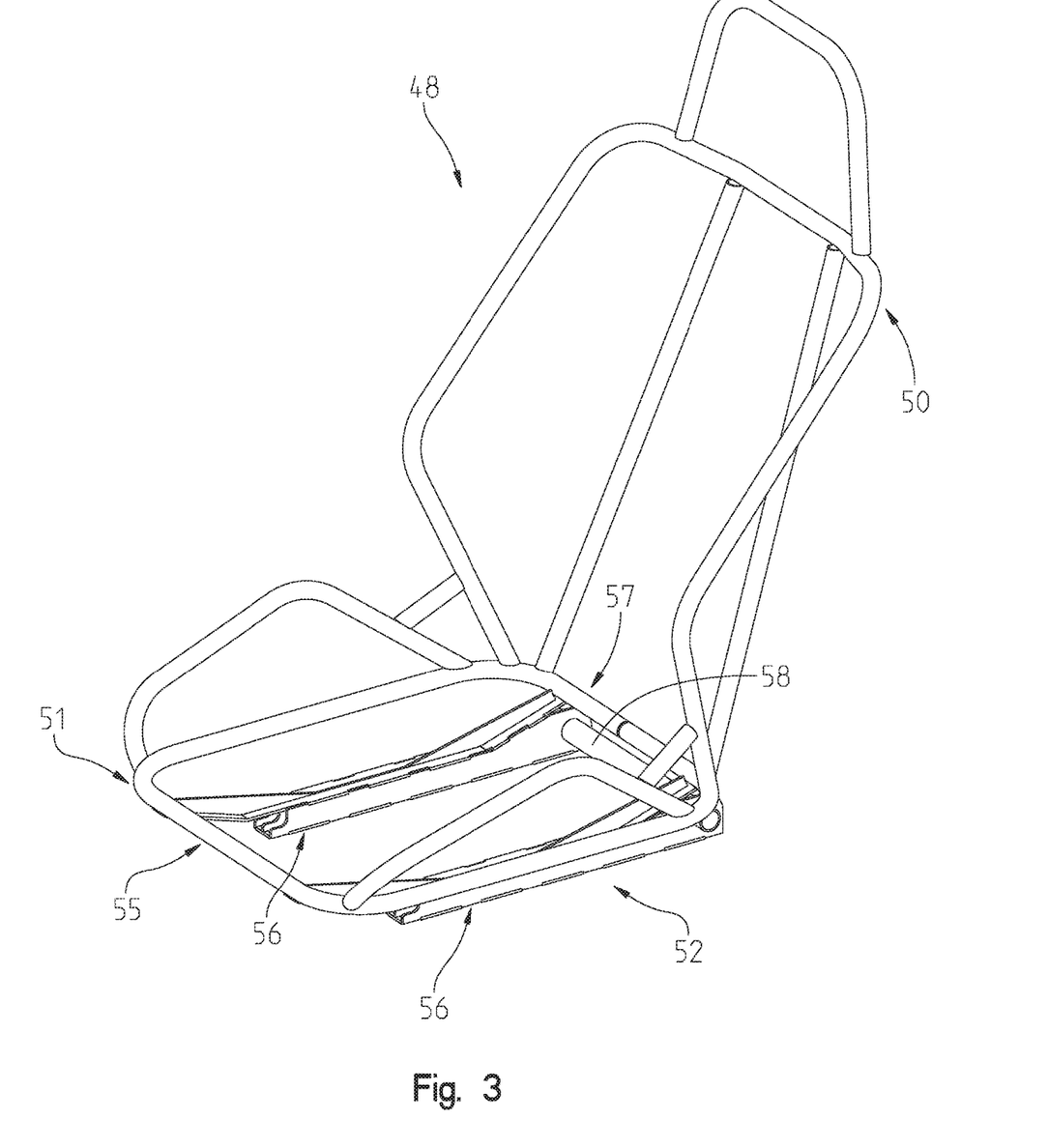
FIG. 3 shows a frame and seat base of a replacement driver's seat of the present disclosure.
Figure 4:
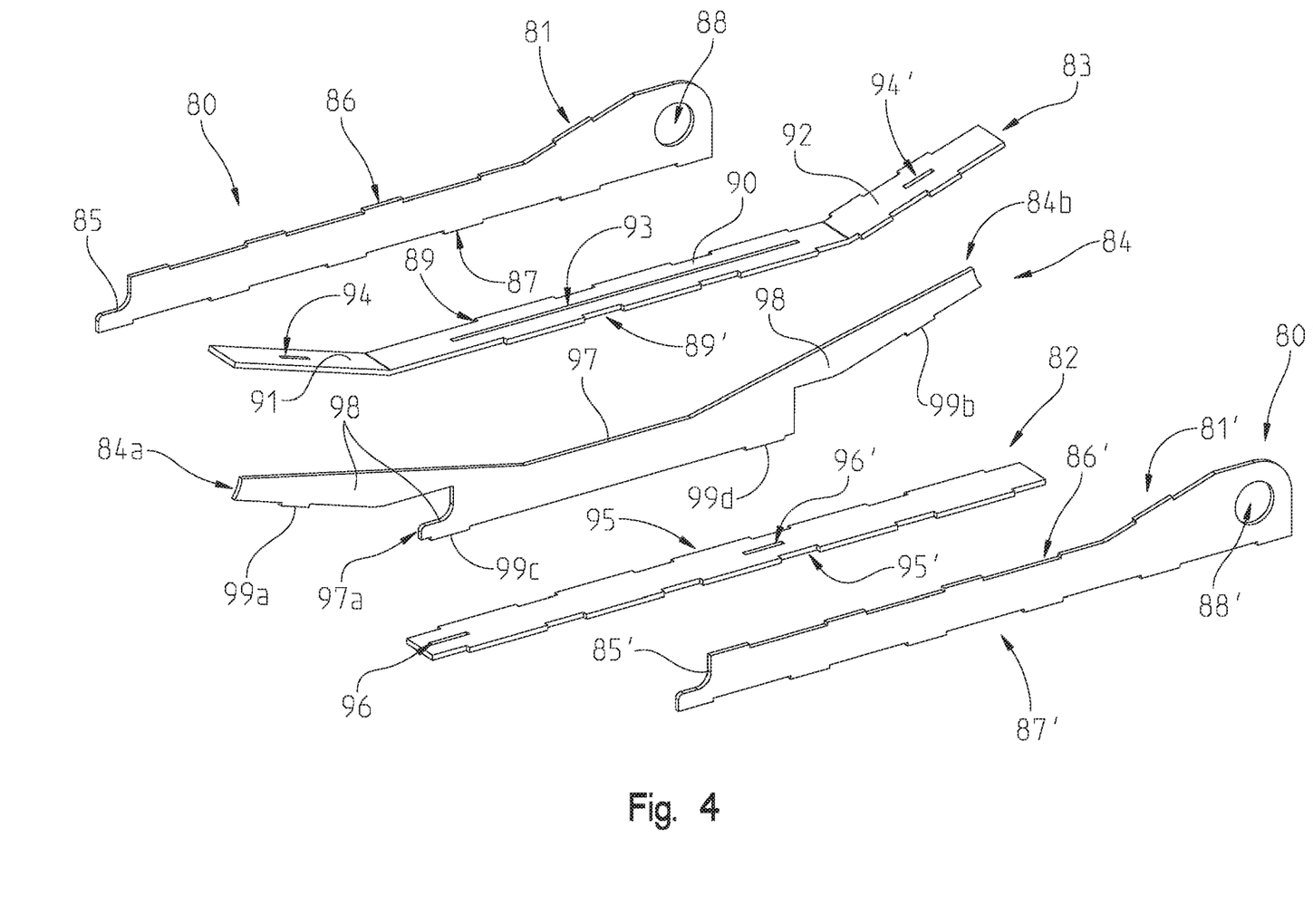
FIG. 4 shows an exploded view of a seat coupling support of the seat base of FIG. 3.
Figure 5:
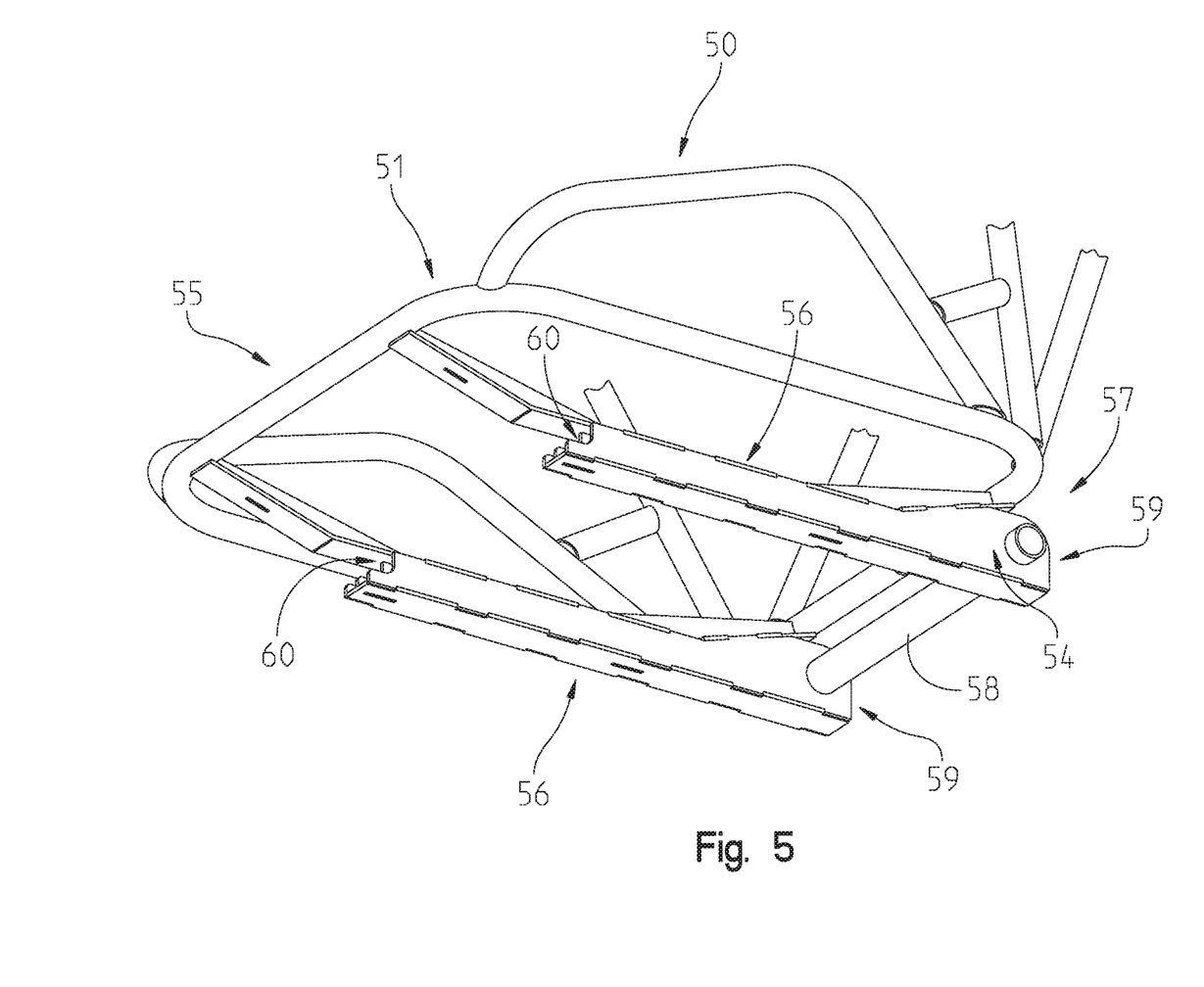
FIG. 5 shows an enlarged bottom left perspective view of the frame and the seat base of replacement driver's seat of FIG. 3.

Referring now to FIGS. 3-5, a replacement driver's seat 48 generally includes a frame 50 and a seat base 52 coupled to a bottom section 51 of frame 50. Frame 50 is configured to support seat cushions and a seat fabric configured to cover the seat cushions (not shown). Seat base 52 generally includes a pair of seat coupling supports 56 extending from a front 55 of seat frame 50 to a rear 57 of seat frame 50, and a rod 58 coupling rear ends 59 (FIG. 5) of seat coupling supports 56. In various embodiments, rod 58 extends beyond an outward facing surface 54 (FIG. 5) of both of seat coupling supports 56.

With reference to FIG. 4, seat coupling supports 56 each include a first side wall 80, a second side wall 80', a bottom wall 82 coupled to first and second side walls 80 and 80', a top wall 83 coupled to first and second side walls 80 and 80', and a coupling member 84. In various embodiments, first side wall 80, second side wall 80', and bottom wall 82 may be formed of a single, unitary piece, while in other various embodiments, walls 80, 80' and 82 are formed as three separate pieces.

First and second side walls 80 and 80' generally include a front indentation 85, 85', a first set of tongue and groove couplings 86, 86' configured to couple with top wall 83, a second set of tongue and groove couplings 87, 87' configured to couple with bottom wall 82, and an opening 88, 88' configured to receive rod 58. In various embodiments, first and second side walls 80, 80' include an inclined portion 81, 81' creating a larger space for opening 88.

Top wall 83 generally includes a first portion 90, a second portion 91 extending forward of first portion 90, and a third portion 92 extending rearward of the first portion 90. In various embodiments, second and third portions 91 and 92 extend upward at an angle relative to first portion 90 such that third portion 92 is configured to mate with inclined portion 81, 81' of first and second side walls 80, 80' and an upper surface of second portion 91 is coupled to front 55 of frame 50 and an upper surface of third portion 92 is coupled to rear 57 of frame 50. First portion 90 generally includes a first opening 93 configured to receive a portion of coupling member 84, and second and third portions 91 and 92 each include an opening 94, 94', each configured to receive a separate portion of coupling member 84. Top wall 83 further includes a first set of tongue and groove couplings 89 configured to couple with tongue and groove couplings 86 of first side wall 80, and a second set of tongue and groove couplings 89' configured to couple with tongue and groove couplings 86' of second side wall 80'. In various embodiments, tongue and groove couplings 86, 86' extend along the edges of first portion 90 and third portion 92 alone.

Bottom wall 82 generally includes a first set of tongue and groove couplings 95 configured to couple with tongue and groove couplings 87 of first side wall 80, a second set of tongue and groove couplings 95' configured to couple with tongue and groove couplings 87' of second side wall 80', and a plurality of openings 96, 96', each configured to receive a portion of coupling member 84.

Coupling member 84 generally includes a body 97 and two arms 98 extending from body 97. In various embodiments, arms 98 extend from body 97 at a angle upward such that front end 84a and rear end 84b of coupling member 84 are coupled to seat frame 50 and body 97 is positioned below a lowermost portion of seat frame 50. Coupling member 84 further includes an indentation 98 along a front portion 97a of body 97.

Still referring to FIG. 4, seat coupling supports 56 are formed by coupling tongue and groove couplings 87, 87' of first and second side walls 80, 80' are coupled with tongue and groove couplings 95, 95' of bottom wall 82, and tongue and groove couplings 89, 89' of top wall 83 with tongue and groove couplings 86, 86' of first and second side walls 80, 81. Prior to or after coupling top wall 83 to first and second side walls 80, 80', body 97 of coupling member 84 is passed through first opening 93 of top wall 83 such that arms 98 are positioned above top wall 83 and body 97 is positioned within first opening and/or below top wall 83. When walls 80, 80', 82, and 83 and coupling member 84 are coupled together, a first tab 99a and a second tab 99b of arms 98 of coupling member 84 are positioned within openings 94, 94' of second and third portions 91 and 92 of top wall 83, and a third tab 99c and a fourth tab 99d along the bottom of body 97 of coupling member 84 are positioned within openings 96, 96' of bottom wall 82. Accordingly, when walls 80, 80', 82, and 83 and coupling member 84 are coupled together, walls 80, 80', 82, and 83 create an interior volume, and body 97 of coupling member 84 is positioned within the interior volume. In various embodiments, once walls 80, 80', 82, and 83 and coupling member 84 are coupled together, tabs 99a-d are welded to their respective walls, and some or all of tongue and groove couplings 86, 86', 87, 87', 89, 89', 95, 95' which are coupled together are welded together. In addition, when walls 80, 80', 82, and 83 and coupling member 84 are coupled together, indentation 98 of coupling member 84 is configured to align with front indentations 85, 85' of first and second side walls 80, 80' to create an opening 60 (FIGS. 3 and 5) for coupling replacement seat 48 to vehicle 2.

Figure 6:
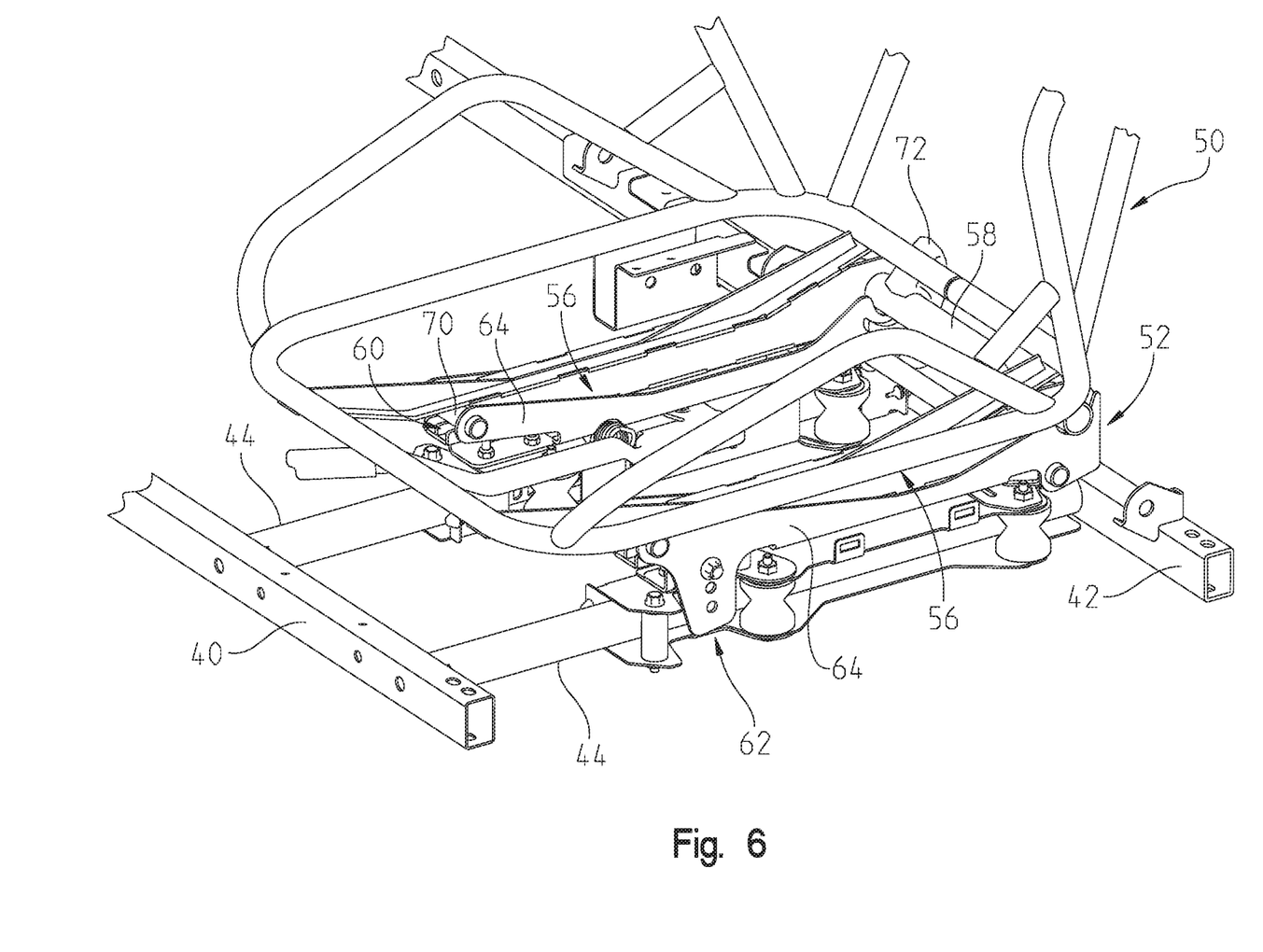
FIG. 6 shows an enlarged front left perspective view of the frame and the seat base of the replacement driver's seat of FIG. 3 and a seat adjustment mechanism coupled to the vehicle frame of the vehicle of FIG. 1.

With reference now to FIG. 6, replacement seat 48 is shown coupled to longitudinal frame tubes 44 of seat support 38 via a seating adjustment mechanism 62. Seating adjustment mechanism 62 couples seat 48 to seat support 38, while allowing it to move in a fore-and-aft direction, as well as tilt. Longitudinal frame tubes 44 include a plurality of apertures 64 configured to interact with seating adjustment mechanism 62 to allow the position of the seat to be adjusted in the fore-and-aft direction. Additional details relating to the seating adjustment mechanism can be found in US Patent Application Publication 2019/0210668, filed on Jan. 10, 2019, the disclosure of which is incorporated herein by reference.

Figure 7:
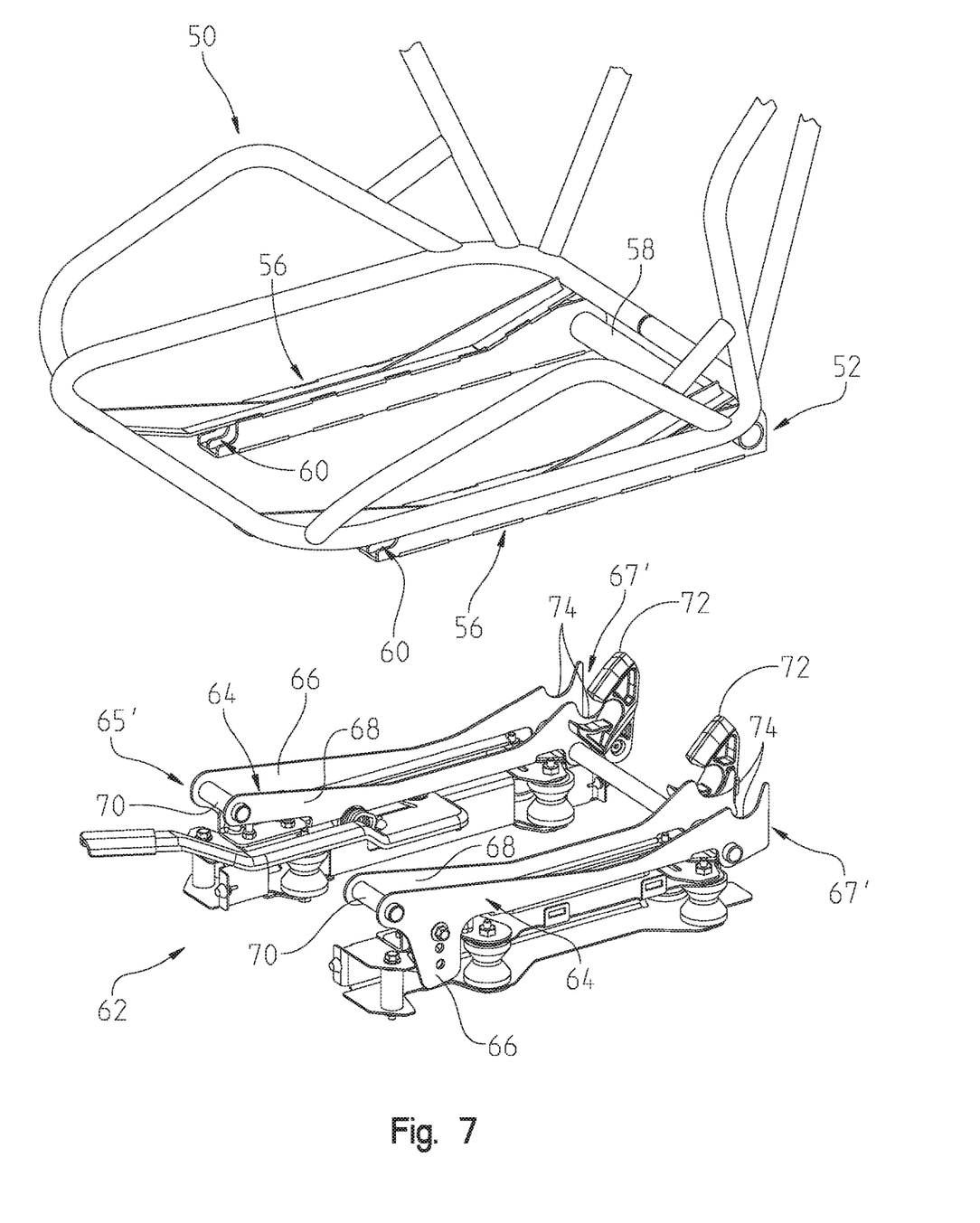
FIG. 7 shows the frame and the seat base of the replacement driver's seat of FIG. 3 exploded away from the seat adjustment mechanism and the vehicle frame of FIG. 6.

Referring now to FIGS. 6 and 7, seating adjustment mechanism 62 includes a pair of longitudinal seat brackets 64 for coupling to seat coupling supports 56 of seat base 52. Longitudinal seat brackets 64 each include an outer wall 66 having a front end 65 and a rear end 67, an inner wall 68 having a front end 65' and a rear end 67', a peg 70 coupling front ends 65, 65' of outer and inner walls 66 and 68, and a latch 72 pivotably coupled to an exterior surface of inner wall 68. Outer and inner walls 66 and 68 of each longitudinal seat bracket 64 each include an indention 74 configured to receive rod 58 of seat 48, while peg 70 is configured to receive opening 60 of seat coupling support 56 of seat base 52, and latch 72 is configured to latch onto rod 58 of seat 48 to secure seat 48 to within indentions 74 of seating adjustment mechanism 62. Longitudinal seat brackets 64 are configured to receive at least a portion of seat coupling support 56 of seat base 52.

To replace seat 24 originally provided with vehicle 2 (i.e., the original equipment manufacturer "OEM" seat), latch 72 is pivoted such that the rod of seat 24 is released and the rear of seat 24 can be pivoted upward. After the rear of seat 24 is pivoted upward, the opening of the seat base of seat 24 is removed from pegs 70 of seating adjustment mechanism 62 such that seat 24 is removed from vehicle 2. Once seat 24 is removed, a replacement seat, namely replacement seat 48, can be coupled to seating adjustment mechanism 62 by placing openings 60 of seat base 52 onto pegs 70 of seating adjustment mechanism 62, and then pushing rear 57 of seat frame 50 downward such that rod 58 of seat base 52 is received by openings 74 and latch 72 couples over rod 58 to hold replacement seat 48 in place. Accordingly, seat 48 is coupled to frame 20 of vehicle 2 without modifications or additional parts.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A replacement seat for a utility vehicle, the replacement seat comprising:
    a frame;
    a seat base coupled to the frame, the seat base having a pair of seat coupling supports including an opening configured to receive pegs of a seat support coupled to a frame of the utility vehicle and a rod extending between the seat coupling supports and being configured to be received within openings of the seat support, the rod being directly coupled to each of the seat coupling supports, the pegs each being fixed within one of a pair of arced bars; and
    each of the pair of seat coupling supports comprising at least a first wall and a second wall opposite the first wall, the first wall and the second wall defining a passageway extending therebetween, and the passageway vertically aligned with the seat support and laterally aligned with the plurality of arced bars.

2. The replacement seat of claim 1, wherein the seat base further comprises the pair of arced bars, a first one of the pair of arced bars being positioned between a first one of the pair of seat coupling supports and the seat frame and a second one of the pair of arced bars being positioned between a second one of the pair of seat coupling supports and the seat frame.

3. The replacement seat of claim 1, wherein the rod extends beyond outward facing surface of the each of the seat coupling supports.

4. The replacement seat of claim 1, wherein at least a portion of the seat coupling supports is configured to be received within at least a portion of the seat support.

5. A method of manufacturing a replacement seat for a vehicle, the replacement seat comprising a seat base and a frame, the method comprising:
    coupling the seat base to the frame,
    the seat base having a pair of seat coupling supports including an opening configured to receive pegs of a seat support coupled to a frame of the vehicle, and a rod extending between the pair of seat coupling supports and being configured to be received within openings in the seat support, the seat base configured for attachment to the seat support through a seating adjustment mechanism having two pairs of arced bars, each arced bar having an opening configured for receiving the pegs of the seat support, and wherein each seat coupling support of the pair of seat coupling supports extends laterally and is positioned between each pair of arced bars.

6. A seat for a utility vehicle, the seat comprising:
    a frame;
    a seat base coupled to the frame, the seat base having a pair of seat coupling supports configured to be received by a seat support coupled to a frame of the utility vehicle, each of the seat coupling supports comprising first and second side walls, a bottom wall, a coupling member, and a top wall, wherein the top wall includes a plurality of openings, each opening configured to receive a portion of the coupling member; and
    wherein the first and second side walls and the coupling member each include an opening, the openings of each of the first and second side walls and the opening of the coupling member being laterally aligned and configured to receive a portion of a seat support coupled to the frame of the utility vehicle.

7. The seat of claim 6, wherein the first and second side walls and the bottom wall are a single, unitary piece.

8. The seat of claim 6, wherein the first and second side walls, the bottom wall, and the top wall form an interior volume, at least a portion of the coupling member being positioned within the interior volume and at least a portion of the coupling member being positioned outside of the interior volume.

9. The seat of claim 6, wherein the coupling member comprises a first portion, a second portion, and a third portion, the second portion and the third portion each extending upwards to a vertical position greater than that of the first portion relative to a ground surface, the vertical position of the second portion being generally equal to the vertical position of the third portion.

10. The seat of claim 6, wherein the top wall of each of the seat coupling supports comprise a first portion, second portion and third portion, the second portion and the third portion each extending upwards to a vertical position greater than that of the first portion relative to a ground surface.

11. The seat of claim 10, wherein an opening of the first portion of the top wall extends a majority length of the first portion of the top wall.

12. The seat of claim 11, wherein the opening is substantially oval shaped.

13. The replacement seat of claim 1, wherein the replacement seat is a replacement driver's seat and is configured for coupling to the utility vehicle after the removal of an original driver's seat of the utility vehicle.

14. A replacement seat for a utility vehicle, the replacement seat comprising:
    a frame; and
    a seat base coupled to the frame, the seat base having a pair of seat coupling supports including an opening configured to receive pegs of a seat support coupled to a frame of the utility vehicle, the seat support including a first pair and a second pair of arced bars, the opening of each seat coupling support aligned laterally such that the pegs extend horizontally and are aligned laterally with one another, and a rod extending between the seat coupling supports and being configured to be received within openings of the seat support, the rod being directly coupled to each of the seat coupling supports, the entirety of the seat support being positioned at a vertical height at least equal to or greater than a vertical height of a lowermost plane of the frame of the vehicle, and wherein each of the seat coupling supports extends laterally between each pair of the arced bars and a maximum lateral extent of each pair of seat coupling supports is less than a maximum lateral extent between each pair of arced bars.

15. A method of manufacturing a replacement seat for a vehicle, the replacement seat comprising a seat base and a frame, the method comprising:
    coupling the seat base to the frame, the seat base having a first seat coupling support and a second seat coupling support, each including an opening configured to receive pegs of a seat support coupled to a frame of the vehicle, the seat support including a first pair of arced bars and a second pair of arced bars, the opening of each seat coupling support being aligned laterally such that the pegs extend horizontally and are aligned laterally with one another, and a rod extending between the first and second seat coupling supports and being configured to be received within openings in the seat support, and wherein the first seat coupling support is arranged between the first pair of arced bars and the second coupling support is arranged between the second pair of arced bars.

\* \* \* \* \*